US009763215B2

(12) United States Patent
Sonnenburg (10) Patent No.: US 9,763,215 B2
(45) Date of Patent: Sep. 12, 2017

(54) LOCATION ESTIMATION METHOD AND SYSTEM (71) Applicant: TomTom Development Germany GmbH, Amsterdam (NL)

(72) Inventor: Sören Sonnenburg, Berlin (DE)

(73) Assignee: TomTom Traffic B.V., Amsterdam (NL)

( * ) Notice: Subject to any disclaimer, the term of this patent is extended or adjusted under 35 U.S.C. 154(b) by 102 days.

(21) Appl. No.: 14/411,668

(22) PCT Filed: Jul. 1, 2013

(86) PCT No.: PCT/EP2013/063863
§ 371 (c)(1),
(2) Date: Dec. 29, 2014

(87) PCT Pub. No.: WO2014/001579
PCT Pub. Date: Jan. 3, 2014

(65) Prior Publication Data
US 2015/0181551 A1    Jun. 25, 2015

(30) Foreign Application Priority Data
Jun. 29, 2012  (GB) .................................. 1211626.5

(51) Int. Cl.
*H04W 24/00* (2009.01)
*H04W 64/00* (2009.01)
(Continued)

(52) U.S. Cl.
CPC .......... *H04W 64/00* (2013.01); *G08G 1/0112* (2013.01); *G08G 1/0133* (2013.01);
(Continued)

(58) Field of Classification Search
USPC ............ 455/404.2, 412.1–414.3 B, 440–441, 455/456.1–456.3, 404.1
See application file for complete search history.

(56) References Cited

U.S. PATENT DOCUMENTS 6,118,403 A     9/2000 Lang
6,567,035 B1 *  5/2003 Elliott .................... G01S 7/022
                                        342/20
(Continued)

FOREIGN PATENT DOCUMENTS

CN    101188103 A    5/2008
WO    0029869 A1     5/2000
(Continued)

OTHER PUBLICATIONS

Search Report issued Oct. 12, 2012 for United Kingdom Patent Application No. GB1211626.5.
(Continued)

*Primary Examiner* — Dai A Phuong (57) ABSTRACT

A method of estimating the geographical location of an object from location information reported by one or more mobile devices having location determining means comprises collecting location data from the one or more mobile devices, preparing the data by selecting features of the data, training an estimator by inputting selected features of the data, and applying the estimator to a map grid to estimate the location of the object. During training of the estimator a kernel machine operates on histograms of distances that are computed with respect to a considered location and the user reports nearby. During application of the estimator, if the estimator assigns a score above a certain threshold a location is marked as the true location of the object. In case multiple locations are predicted, a subsequent clustering merges multiple predictions into one by using the weighted mean.

14 Claims, 6 Drawing Sheets (51) Int. Cl.
*G08G 1/01* (2006.01)
*G08G 1/00* (2006.01)
*H04W 4/02* (2009.01)

(52) U.S. Cl.
CPC .............. *G08G 1/0141* (2013.01); *G08G 1/20* (2013.01); *H04W 4/023* (2013.01); *H04W 4/028* (2013.01)

(56) References Cited

U.S. PATENT DOCUMENTS

| | | | |
|---|---|---|---|
| 6,675,085 | B2 | 1/2004 | Straub |
| 7,809,500 | B2 | 10/2010 | Couckuyt et al. |
| 8,010,227 | B2* | 8/2011 | Elliott .................... G01C 21/32 455/414.2 |
| 8,099,466 | B2 | 1/2012 | Tenereillo |
| 8,543,335 | B2 | 9/2013 | Gruijters et al. |
| 8,842,004 | B2 | 9/2014 | Kabler et al. |
| 2002/0022920 | A1 | 2/2002 | Straub |
| 2003/0130793 | A1* | 7/2003 | Patwari ................. H04W 64/00 701/300 |
| 2006/0075023 | A1* | 4/2006 | Tenereillo ............. G06Q 10/06 709/205 |
| 2006/0178809 | A1 | 8/2006 | Couckuyt et al. |
| 2010/0279708 | A1* | 11/2010 | Lidsrom ................. H04W 4/02 455/456.1 |
| 2013/0260782 | A1* | 10/2013 | Un ........................ H04W 64/00 455/456.1 |
| 2014/0057659 | A1* | 2/2014 | Udeshi ................... H04W 4/02 455/456.3 |
| 2015/0242441 | A1* | 8/2015 | Ramesh ............ G06F 17/30256 707/722 |
| 2016/0081051 | A1* | 3/2016 | Kim ..................... A61B 5/1116 340/870.07 |
| 2016/0226872 | A1* | 8/2016 | Oberheide ............. G06F 21/44 |
| 2017/0034666 | A1* | 2/2017 | Priness ................... H04W 4/04 |
| 2017/0065891 | A1* | 3/2017 | Lockton ................ A63F 13/332 |

FOREIGN PATENT DOCUMENTS

| | | |
|---|---|---|
| WO | 2010040390 A1 | 4/2010 |
| WO | 2011053389 A1 | 5/2011 |
| WO | 2011071826 A1 | 6/2011 |

OTHER PUBLICATIONS

International Search Report issued Oct. 24, 2013 for International Patent Application No. PCT/EP2013/063863.

* cited by examiner

LOCATION ESTIMATION METHOD AND SYSTEM

CROSS-REFERENCES TO RELATED APPLICATIONS

This application is the National Stage of International Application No. PCT/EP2013/063863, filed Jul. 1, 2013 and designating the United States. The application claims priority from United Kingdom Patent Application No. 1211626.5 filed Jun. 29, 2012. The entire content of both these applications is incorporated herein by reference.

FIELD OF THE INVENTION

The present invention relates to apparatus and a method for estimating the location of an object based upon location information reported from one or more mobile devices, such as portable navigation devices.

BACKGROUND TO THE INVENTION

A variety of mobile devices now exist which have the capability of determining their own location. Portable navigation devices (PNDs) that include GNSS (Global Navigation Satellite Systems) signal reception and processing functionality are well known and are widely employed as in-car or other vehicle navigation systems. Such devices include a GNSS antenna, such as a GPS antenna, by means of which satellite-broadcast signals, including location data, can be received and subsequently processed to determine a current location of the device. The device may also include electronic gyroscopes and accelerometers which produce signals that can be processed to determine the current angular and linear acceleration. The determined acceleration may then be used in conjunction with location information derived from the GPS signal to determine the velocity and relative displacement of the device and thus vehicle in which it is typically mounted. Such sensors are most commonly provided in in-vehicle navigation systems, but may also be provided in the PND itself.

In recent years, GPS has also been used in systems to warn drivers of speed traps, enforcement cameras and road hazards, such as school zones and accident black spots. In such systems, a device having a GPS antenna and access to a database containing the location of speed traps, accident black spots and other relevant items is typically provided in a vehicle. The device is configured to provide warnings to a driver when the vehicle, using the location information derived from the GPS signal, is in the vicinity of one of the locations stored in the database. One such system is described, for example, in WO 01/55744 A2.

The ubiquity of devices utilising global navigation satellite systems enables a new kind of user-provided input, namely the reporting of the presence or absence of objects at a certain location. Of particular interest are objects relevant to drivers, such as speed limit enforcement devices, traffic congestion, road closures/works, parking locations, etc.

Devices that are capable of sending and receiving location information to/from a database are referred to as "connected devices". Users of such devices can provide an input, such as pressing a physical or virtual button, to report the location of an object. The current location, typically as provided by the GPS, or potentially by the user, is used to indicate the location of an object. The user can select the type of object (e.g. parking location, speed cam or other) for general purpose devices or may report locations for special purpose devices (e.g. radar trap detectors).

Based upon such user inputs the exact localisation of the object is hindered by:
a) low resolution of the geographical coordinates provided by the device/user;
b) inaccurate reports (i.e. the user selecting the wrong location or reporting when no longer in the vicinity);
c) adversely reported false locations.

Accordingly, embodiments of the present invention aim to provide a method and system for estimating accurately an object's location, based on statistics of reports from users in the vicinity of the object. In particular, in accordance with embodiments of the present invention the user reports, i.e. geographical coordinates (or "geo-coordinates") and object type, are collected at a remote server, e.g. in a database, and form the input to the system proposed herein for accurate and robust detection of the object location.

SUMMARY OF THE INVENTION

The invention is defined in the attached independent claims, to which reference should now be made. Further, preferred features may be found in the sub-claims appended thereto.

According to one aspect of the present invention there is provided a method of creating an estimating model, for estimating the geographical location of an object, based upon location information supplied by a plurality of mobile devices with location determining means, the method comprising:

collecting known actual object location data of a number of objects, collecting reported potential object location data from the plurality of mobile devices, defining at least one parameter indicative of the relationship between the known actual object location data and the reported potential location data, calculating the value of the or each parameter for each pair of known actual object locations and reported potential object locations, generating at least one histogram representing the calculated value of the or each parameter for each known actual object location, and using the or each histogram to create a scoring function capable of representing the probability that a histogram is indicative of an actual object.

The method may also include applying location data of known false locations, calculating the value of the or each parameter for each pair of known false locations and reported potential object locations, and generating at least one histogram representing the calculated value of the or each parameter for each known false object location.

The false object location data may comprise one or more randomly generated locations within an area having at least a minimum number of reported potential object locations, and which are a predetermined minimum distance from known actual object locations.

The step of generating at least one histogram may comprise creating multiple histograms for at least some of the actual objects and/or false locations at different spatial resolutions.

Alternatively or additionally, multiple histograms may be generated for at least some of the actual objects and/or false locations using two or more of the parameters.

The parameters may include, but are not limited to, one or more of the following: the geographic distance between locations, the travel time between locations and the distance between locations on the road network.

As will be appreciated, the step of generating at least one histogram representing the calculated value of the or each parameter comprises binning the calculated parameter values into a plurality of bins.

The invention also includes a method of estimating the location of an object within a geographical area based upon potential object location data reported by a plurality of mobile devices having location determining means, the method comprising:

collecting potential object location data from the plurality of mobile devices, dividing the geographical area into a plurality of regions, and for at least some of the regions:

determining information indicative of the distance between a point associated with a region and the potential object location reported by at least some of the mobile devices, and applying an estimator model to assign a score to the point indicative of a probability that the point corresponds to an actual object, and estimating the location of the object based upon the scores assigned to the points.

The geographical area may be divided into a plurality of regions by applying a grid to the geographical area. The point associated with a region is preferably a grid point, although it will be appreciated that the point may be any position within each region defined by the grid, such as the centre of the region.

The method may comprise selecting the points to which the estimator model is applied based upon the number of potential object reports within a predetermined distance of the point.

The method may include determining which points have an assigned score greater than a predetermined threshold, clustering qualifying points that lie within a predetermined distance of each other and performing a weighted average to estimate the location of the object.

The method may be repeated with new reported potential object location data periodically or substantially continuously.

The method may include creating an estimator model by a method according to any statement herein.

The invention also includes a computer program product comprising computer program code arranged in use to perform a method according to any statement herein when said computer program code is run on a computer. The computer program code may be embodied in a computer readable medium.

The invention also includes a system, optionally a server system, arranged to process data for the maintenance of a database containing the geographic location of objects, the system comprising communication means for receiving reports from a plurality of mobile devices having location determining means, the reports each comprising geographical location data of a potential object, and processing means arranged to process the reports by applying a method of estimating the location of an object, the method being according to any statement herein.

The methods and/or systems according to any statement herein may be arranged in use to estimate the location of an object which comprises a speed enforcement device.

The invention may include any combination of the features or limitations referred to herein, except such a combination of features as are mutually exclusive, or mutually inconsistent.

BRIEF DESCRIPTION OF THE DRAWINGS

A preferred embodiment of the present invention will now be described. By way of example only, with reference to the accompanying diagrammatic drawings, in which.

DETAILED DESCRIPTION OF PREFERRED EMBODIMENTS

The present invention is directed, in preferred embodiments, to a method and system for processing data to maintain a database of speed limit enforcement devices. In order to keep the data in the database accurate and up to date, the system utilises information in the form of reports received from a plurality of mobile devices. In other words, the system relies on a community of users to continually supply information on new speed limit enforcement devices not already in the database, and to validate the details associated with the devices already in the database.

The mobile devices can be of any suitable form, but in illustrative embodiments are navigation apparatus, such as portable navigation devices (PNDs). Preferred embodiments of the present invention will now be described with particular reference to a PND. It should be remembered, however, that the teachings of the present invention are not limited to PNDs but are instead universally applicable to any type of processing device that is configured to warn or alert drivers when they are approaching speed limit enforcement devices using a local and/or remote database listing such devices. It follows therefore that in the context of the present invention, the mobile devices could be a PND, a navigation device built into a vehicle, or indeed a computing resource (such as a desktop or portable personal computer (PC), mobile telephone or portable digital assistant (PDA)). The term "mobile device having location determining means" is used in this specification to refer to any type of mobile device having the capability to identify its own location.

Figure 1:
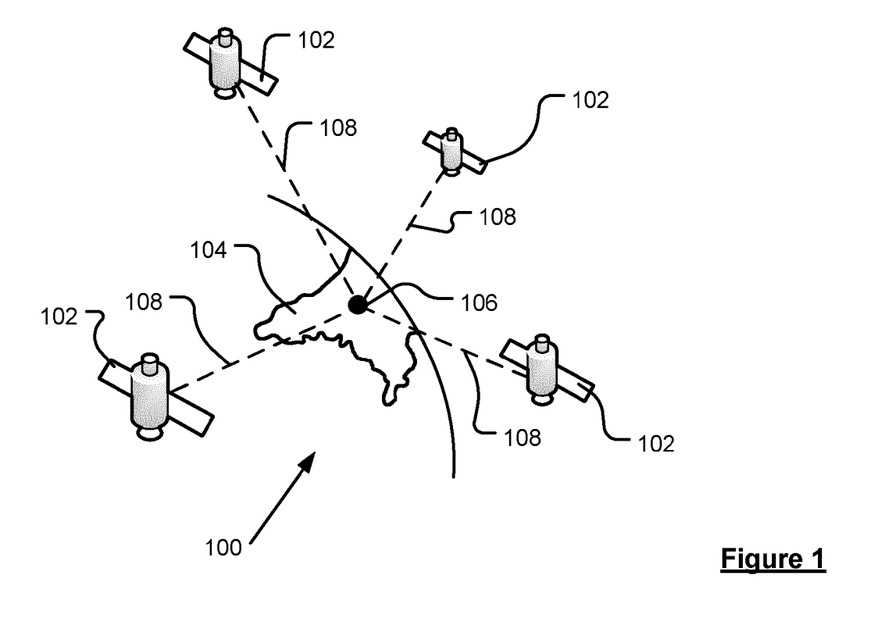
FIG. 1 is a schematic illustration of a Global Positioning System (GPS)

FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 102 are in orbit about the earth 104. The orbit of each satellite 102 is not necessarily synchronous with the orbits of other satellites 102 and, in fact, is likely asynchronous. A GPS receiver 106 is shown receiving spread spectrum GPS satellite signals 108 from the various satellites 102.

The spread spectrum signals 108, continuously transmitted from each satellite 102, utilize a highly accurate frequency standard accomplished with an extremely accurate atomic clock. Each satellite 102, as part of its data signal transmission 108, transmits a data stream indicative of that particular satellite 102. It is appreciated by those skilled in the relevant art that the GPS receiver device 106 generally acquires spread spectrum GPS satellite signals 108 from at least three satellites 102 for the GPS receiver device 106 to calculate its two-dimensional position by triangulation. Acquisition of an additional signal, resulting in signals 108 from a total of four satellites 102, permits the GPS receiver device 106 to calculate its three-dimensional position in a known manner.

Figure 2:
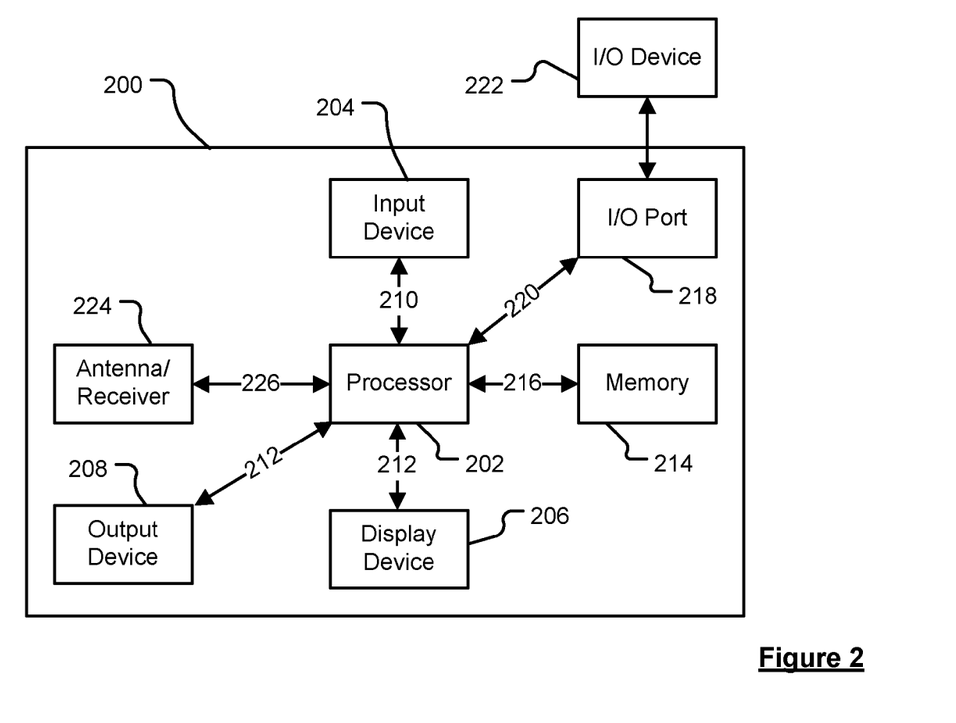
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 202 connected to an input device 204 and a display screen 206. The input device 204 can include a keyboard device, voice input device, touch panel and/or any other known input device utilised to input information; and the display screen 206 can include any type of display screen such as an LCD display, for example. In a particularly preferred arrangement the input device 204 and display screen 206 are integrated into an integrated input and display device, including a touchpad or touchscreen input so that a user need only touch a portion of the display screen 206 to select one of a plurality of display choices or to activate one of a plurality of virtual buttons.

The navigation device 200 may include an output device 208, for example an audible output device (e.g. a loudspeaker). As output device 208 can produce audible information for a user of the navigation device 200, it is should equally be understood that input device 204 can include a microphone and software for receiving input voice commands as well.

In the navigation device 200, processor 202 is operatively connected to and set to receive input information from input device 204 via a connection 210, and operatively connected to at least one of display screen 206 and output device 208, via output connections 212, to output information thereto. Further, the processor 202 is operably coupled to a memory resource 214 via connection 216 and is further adapted to receive/send information from/to input/output (I/O) ports 218 via connection 220, wherein the I/O port 218 is connectible to an I/O device 222 external to the navigation device 200. The memory resource 214 comprises, for example, a volatile memory, such as a Random Access Memory (RAM) and a non-volatile memory, for example a digital memory, such as a flash memory. The external I/O device 222 may include, but is not limited to an external listening device such as an earpiece for example. The connection to I/O device 222 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 202 and an antenna/receiver 224 via connection 226, wherein the antenna/receiver 224 can be a GPS antenna/receiver for example. It will be understood that the antenna and receiver designated by reference numeral 224 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

Figure 4:
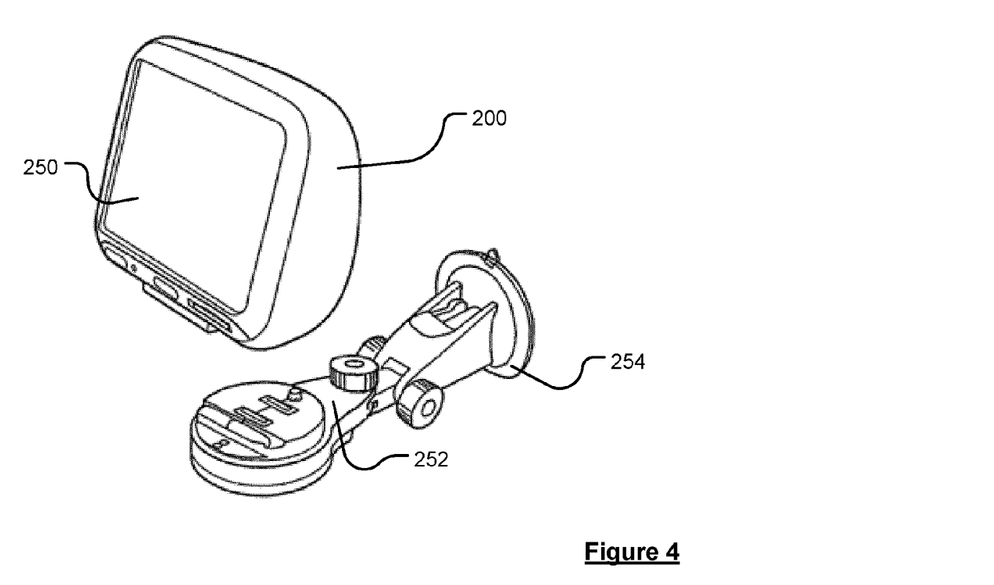
FIG. 4 is a perspective view of a navigation device.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use. As an example, FIG. 4 shows a navigation device 200 that may sit on an arm 252, which itself may be secured to a vehicle dashboard, window, etc using a suction cup 254. This arm 252 is one example of a docking station to which the navigation device 200 can be docked. The navigation device 200 can be docked or otherwise connected to the arm 252 of the docking station by snap connecting the navigation device to the arm, for example. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Figure 3:
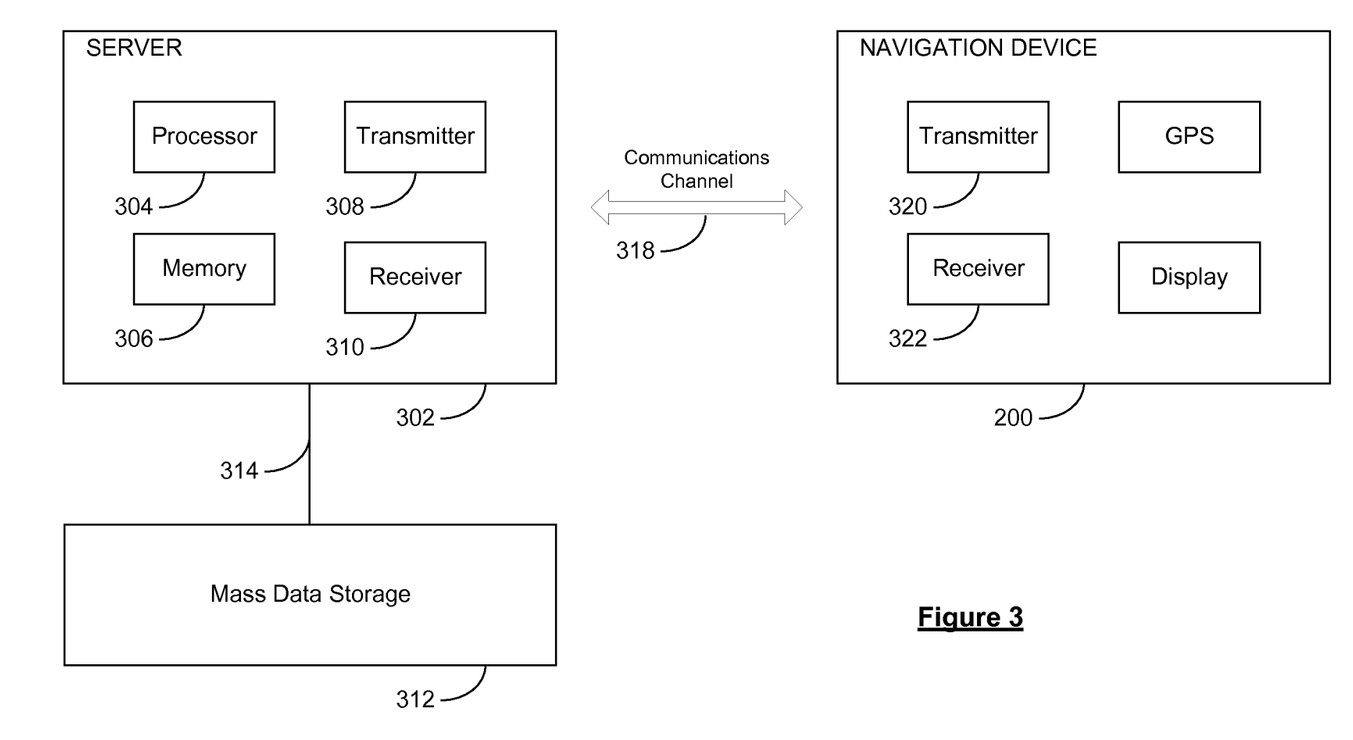
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc; model/manufacturer specific settings may be stored on the navigation device 200, for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc. In other embodiments, the server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As is known in the art, the navigation device 200 may be configured to provide warnings when a vehicle is approaching a speed limit enforcement device, such as a mobile or fixed speed camera. In particular, the warning may be provided when the vehicle is approaching the speed limit enforcement device at a speed that is above the legal speed limit for the road. The warnings may comprise a visual warning on the display 206 of the navigation device 200, an audible warning, a haptic warning, or any combination thereof as desired. In order to provide such warnings, the navigation device has access to a database of speed limit enforcement devices, which includes at least the location of speed limit enforcement device and a speed limit for the device. The database will typically be stored on the navigation device 200, e.g. in the memory 214, and will be regularly updated with new data from the server 302 using the communication channel 318. It is envisaged, however, that the navigation device 200 may only temporary store portions of the database for speed limit devices in their immediate vicinity or a planned route.

The speed cameras in the database each have at least one attribute, and typically a plurality of attributes, associated therewith. The attributes can be, for example: a location of the speed camera; a speed limit associated with the camera; the side of the road on which the speed camera is operational; and the type of the speed camera (e.g. a fixed camera, a mobile camera, part of an average speed trap).

Due to the nature of speed cameras, e.g. new fixed speed cameras are continually being installed, fixed speed cameras may be moved to a new location, mobile speed cameras will often be in operation for short periods of time, etc, the information in the database on the server 302 needs to be constantly refreshed to ensure that it is accurate and up to date.

The present invention enables the robust location of objects such as speed cameras based upon community input, utilising a machine learning method.

Figure 5:
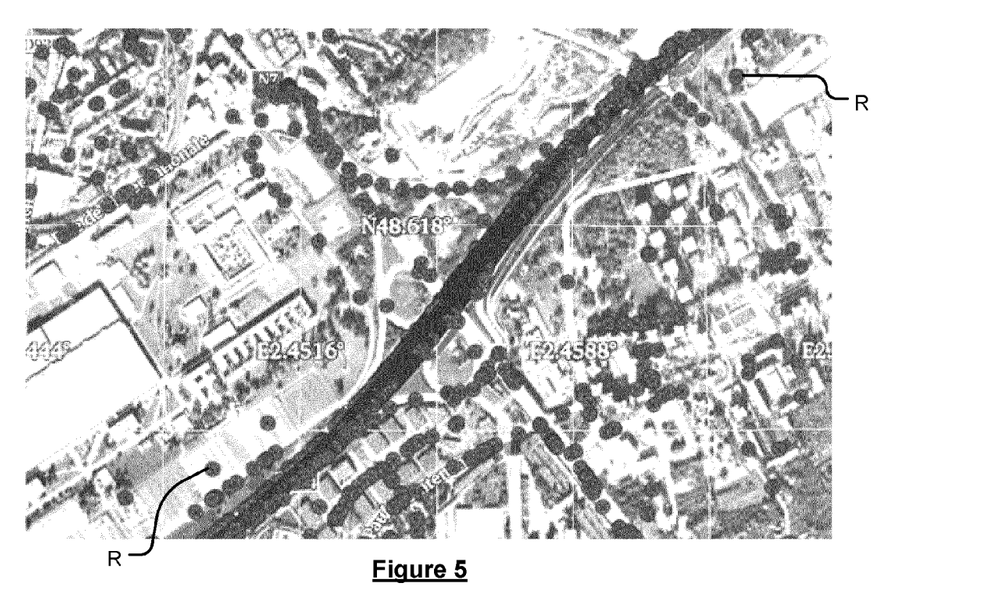
FIG. 5 shows schematically a plurality of user reports represented as points on a map.

FIG. 5 shows user reported locations of speed cameras as circles R on a map.

In accordance with preferred embodiments of the invention, firstly an estimator model is created and trained using data which is known. Then the trained estimator applied to reported location data to accurately estimate the location of an (unknown) object.

The creation and training of the estimator model involves machine-learning, which is used to train a kernel machine. This involves taking reports from users which relate to objects, and comparing the user-reported location data with the objects that exist in reality, the location of which is known. This is performed off-line.

Firstly the necessary data must be collected. P locations of known actual objects of one kind are given for example as, for example, geo-coordinates:

$$Obj_{loc} = (lon, lat)_{i=1}^{P}$$

and U user reports, each reporting a potential object, are given by:

$$Usr_{loc} = (lon, lat)_{i=1}^{U}$$

Optionally a set F of false locations—each comprising randomly generated locations within an area having a certain minimum number of user reports and that are a predetermined known distance away from known actual object locations—is assumed—i.e.

$$Fls_{loc} = (lon, lat)_{i=1}^{F}$$

Training can be performed without the use of false locations, but will be less effective.

Then the data must be prepared. Given the sets $\{Obj_{loc}, Usr_{loc}, Fls_{loc}\}$ features are extracted that will be inputs to the learning machine.

At least one parameter is defined which is indicative of the relationship between objects and user-reported locations, and between false locations and user-reported locations. The parameter may be for example the geographical distance between the locations, the travel time between them or the distance between them on the road network. Then the or each parameter is calculated for each pair of actual object location and user-reported locations and for each pair of false location and user-reported locations.

Figure 6:
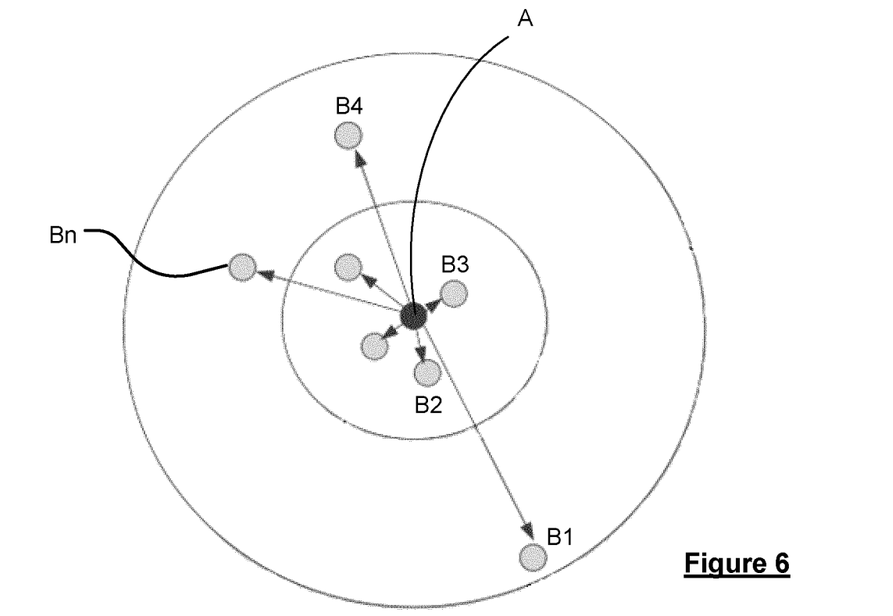
FIG. 6 shows schematically the computation of distances between object loci or user loci and a reference location.

FIG. 6 shows schematically the computation between a reference A and user-reported loci and object loci B1-Bn.

For each actual object location and false object location the data is binned based upon the calculation of the or each parameter, thereby creating a plurality of histograms. At least one histogram is created for each actual object and for each false location. Multiple histograms can be created for each actual object or false location at different spatial resolutions and/or multiple histograms can be generated for each location using two or more of the parameters.

Figure 7:
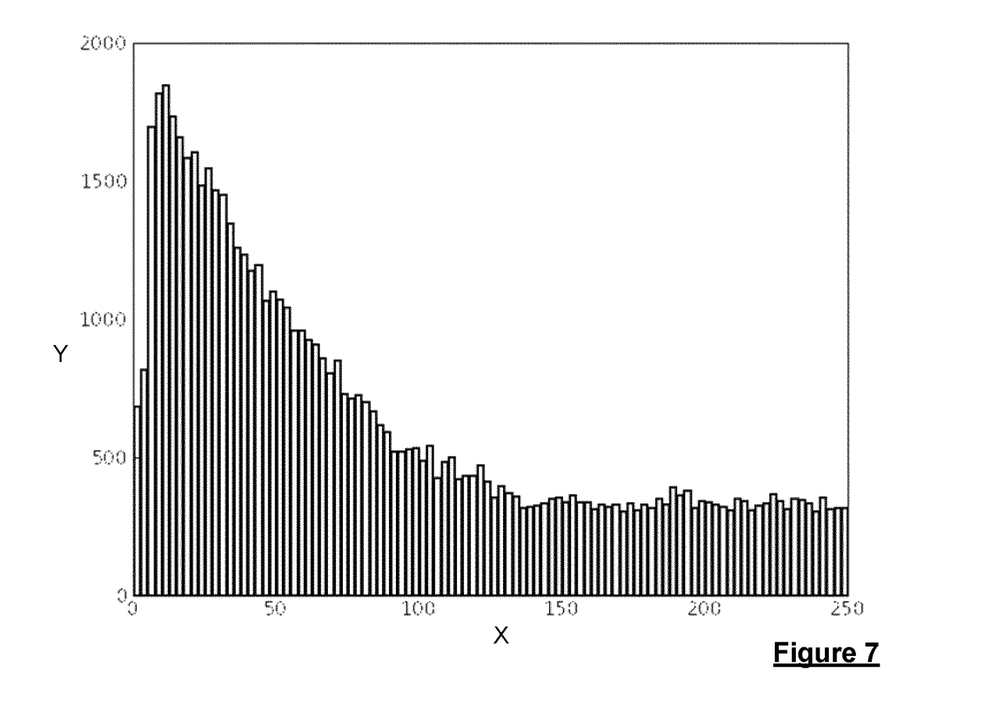
FIG. 7 is a histogram representing the distribution of user reports.

FIG. 7 shows an example. Utilising distances from a reference to the user reports, bins are defined along axis X from e.g. 0-10 m, 10-20 m, . . . , 90=100 m, in each case counting how often user reports fall into the respective bin, the number of reports being indicated on axis Y. These histograms should have a higher number of reports in the first—i.e. nearby—bins when they are computed considering an object as a reference.

In order to improve the sensitivity of the method a set of such histograms may be computed with e.g. a fixed number of bins but considering different ranges, e.g. fixing 10 bins for 0-100 m, then 10 bins for 0-200 m, . . . . , 10 bins for 0-1000 m. Considering a whole set of such histograms at different spatial resolutions will later aid the learning machine in determining the coarse, and also fine grained, location of the object. Preferably each of the histograms transformed into a relative histogram by normalisation to have norm 1. These two changes help accurate localisation of objects in situations when various objects are close to each other, resulting in a higher number of user reports in that area.

These sets of histograms computed for all objects and false locations may now be used as a training set for a machine learning method. Formally the P+F examples $(x_i, y_i)_{i=1}^{P+F}$ are considered that are tuples of (concatenated normalised histograms, label), where label $y_i$=+1 if $x_i$ corresponds to a histogram computed for an object, and $y_i$=1 otherwise.

Next the model must be trained. Based on a sample of N=P+F inputs $(x_i, y_i)_{i=1}^{N}$, an estimator $f(x) \to R$ is trained that assigns a real valued score to each considered location, where each location is represented as the concatenated set of normalised histograms. A higher score denotes a location that is potentially more likely to embody an object.

Particularly well suited is an estimator known as a kernel machine that is formally defined as $$f(x)=\Sigma_{i=1}^{N}\alpha_i y_i K(x,x_i)+b$$

In this equation K denotes the so called Kernel that is used to compare examples. For accurate results it is essential to select a proper kernel. Since in this case inputs are histograms, suitable kernels include the histogram intersection kernel $$k(x,x')=\Sigma_{i=1}^{d}\min(x_i,x'_i)$$

and the Jenson Shannon kernel $$k(x, x') = \sum_{i=1}^{d} \frac{x_i}{2}\log_2\frac{x_i+x'_i}{x_i} + \frac{x'_i}{2}\log_2\frac{x_i+x'_i}{x'_i}$$

The weights $a_i$ and b are estimated in a training procedure for which various learning algorithms can be used, e.g. that of the Support Vector Machine, Kernel Fisher Discriminant Analysis or Kernel Ridge Regression.

To determine the model performing best in an out-of-sample analysis, a model selection procedure such as cross validation can be used in a training procedure to determine relevant hyper parameters, such as the selected kernel and regularisation parameter using e.g. the F1 score or the area under the precision recall curve as performance measure.

Next the model must be applied. To apply the estimator to detect objects, firstly a discrete grid is created over a considered area of interest (e.g. within a 1000×1000 m area grid with a grid point every 10×10 m). Then each grid point must be scored by the estimator f(x). In order to do this a) distances from the grid point to the user-reported locations are computed, b) normalised concatenated histograms are computed based on the distances, and c) the estimator f(x) is applied to the concatenated normalised histograms.

It should be noted that only grid points need to be considered around which user reports exist.

Figure 8:
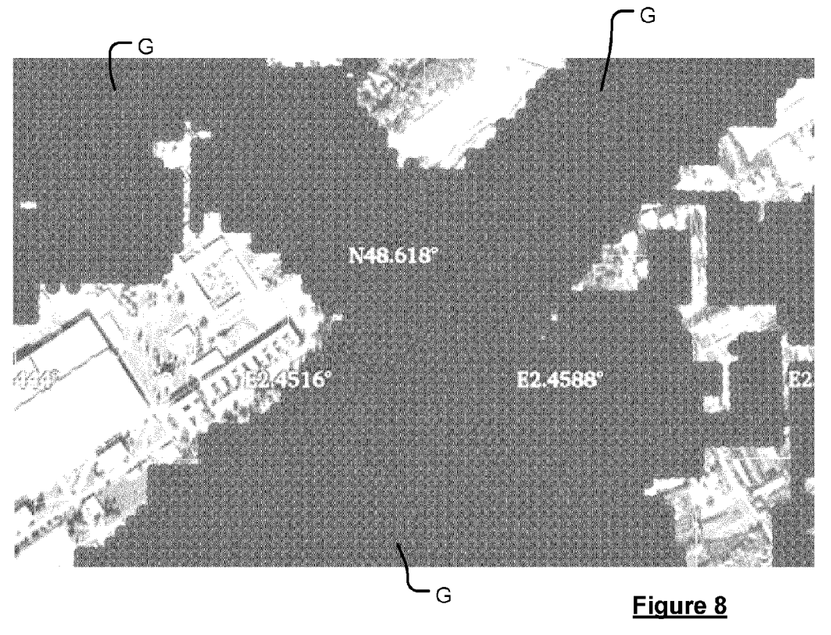
FIG. 8 shows schematically filtered grid points which have a certain minimum number of reports in their vicinity.
Figure 9:
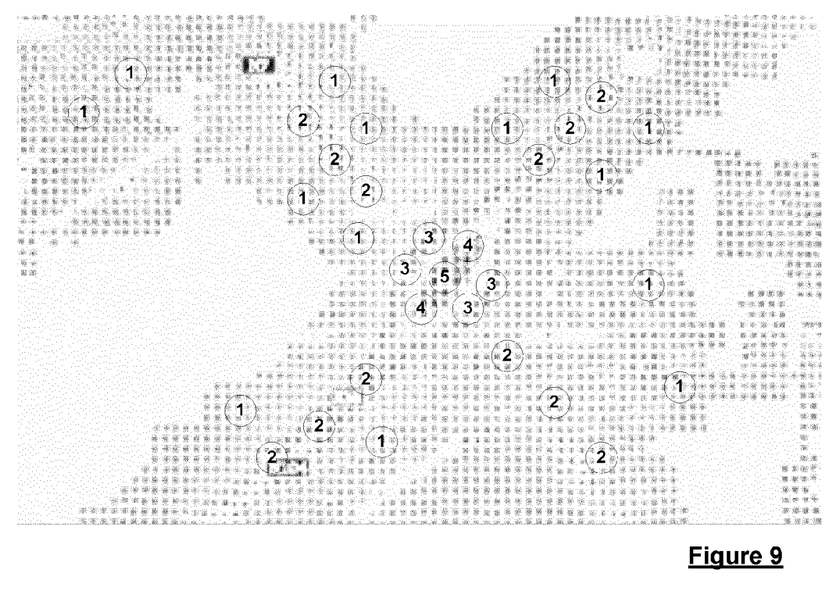
FIG. 9 shows the grid points of FIG. 4 now scored by estimator f(x)

Since the number of grid points to consider can still be high it is worthwhile to decrease the computational burden by filtering out grid points that have fewer than a certain number of user reports in their vicinity. For example only grid points that have more than 10 reports within a radius of 500 m from the grid point may be considered. FIG. 8 shows the grid points to be considered for prediction after filtering. Then the estimator f(x) is applied (FIG. 9). The threshold f (x)>0 is applied to the real valued score f(x). Scores above the threshold denote grid points that contain the object. Due to the fuzzy nature of user reports it can be expected that a number of grid points that are all close to each other become "active". To merge such active but close-by grid points to a single prediction, a clustering step is performed that iteratively merges loci close to each other as long as an active grid point is found within a certain maximum distance, e.g. 50 m. While merging, the weighted mean of locations is used. The clustering process may be repeated until there are no other active grid points within a defined vicinity. The final estimated location following clustering is taken as an estimate of an object's location in reality.

For a live system the estimator can be applied at regular intervals, e.g. every day, week, month, or when a certain number of reports are received within a defined geographic area.

Figure 10:
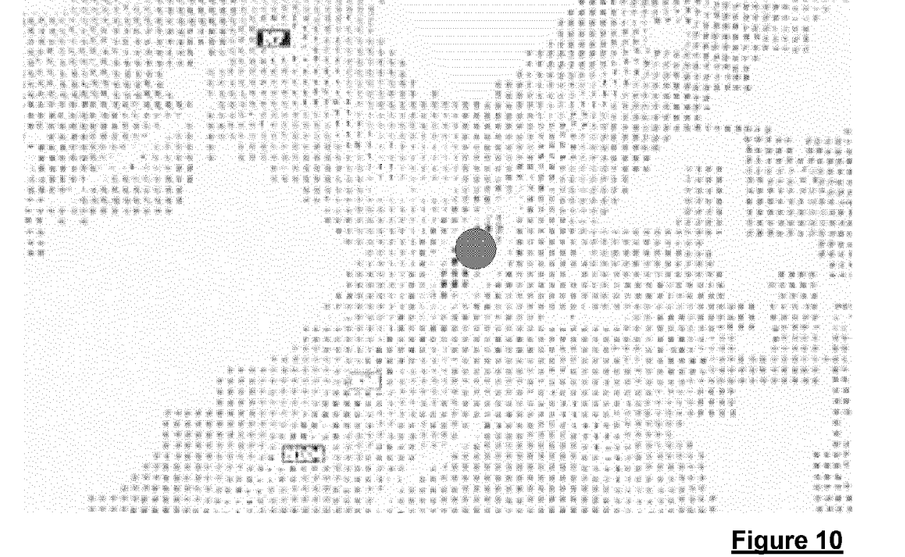
FIG. 10 represents the prediction of an object location after a clustering operation.
Figure 11:
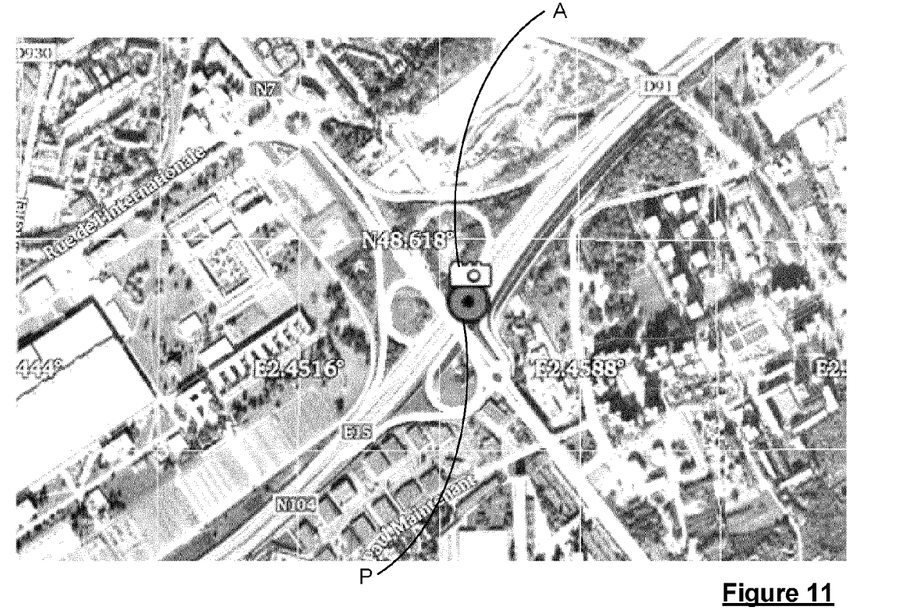
FIG. 11 shows the relationship between a predicted object location and the ground truth—ie actual verified location of the object.

FIGS. 8 to 11 show the stages in the estimation of the object location. FIG. 8 shows filtered grid points G, a large number which in this case is shown as a shaded area, that have a certain minimum number of reports in their vicinity. FIG. 9 shows the grid points after scoring by the estimator. There are several categories of grid points ranging from 1 as the lowest score to 5 as the highest score. For ease of representation only a few of each category are labelled. FIG. 10 illustrates the grid points after a clustering process, again with only a few of each score labelled. Finally, FIG. 11 shows the prediction P (estimation) of the location of the object compared with the actual location A obtained using verified information—i.e. ground truth—indicated by a camera logo.

Whilst many different kinds of objects could have their locations determined using the techniques outlined above, there follows a description of how this approach can be applied to the localization of speed cameras. A speed camera reporting system based on user supplied information is described in the Applicant's co-pending application GB 1204006.9 filed 7 Mar. 2012; the entire contents of which is incorporated herein by reference.

In order to compute the distance from a reference location to a user-reported location, travel time, distance on the road or, in case map information is absent, geographical distance can be used. One key to developing a speed camera predictor is to have ground-truth information available. To this end a reference data set marking the presence of cameras (or areas with their absence) is created using manual labour utilising various sources such as: human experience, characteristic speed profiles around cameras and/or test drives.

Then the object localisation method (training, use and evaluation of the estimator) is directly applicable.

In a live speed-cam system, the estimator can be run as soon as a new user report is received, or periodically once a certain number of new user reports have been received for a particular geographical area. The area in which the estimator has to update its predictions is as big as the maximally considered distance on the histograms. Since the live speed cam system keeps a history for each camera, the updated predictions need to be compared with the previously predicted camera locations and updated as follows:

1. Cameras that are predicted to be no longer present are marked as deleted (i.e. no updated camera is predicted within a certain distance d).
2. The location of cameras whose location changes slightly (i.e. within a certain distance d) is updated.
3. The cameras that are newly created where no camera existed within a certain distance d are inserted as new cameras in the database.

Alternatively the object localization method can be used to suggest highly likely locations of speed cameras to human moderators that can then ensure an exact estimation of location, based on prior knowledge or other sources, such as test drives.

It will be appreciated that whilst various aspects and embodiments of the present invention have heretofore been described, the scope of the present invention is not limited to the particular arrangements set out herein and instead extends to encompass all arrangements, and modifications and alterations thereto. For example, whilst the embodiments in the foregoing detail description refer to specifically to a system for maintaining a database of speed cameras, it will be understood that a similar system could be used with other types of data. In particular, data in an electronic map that is temporary in nature, such as the location and/or availability of parking areas, either individual spaces or multiple spaces in a parking lot, and the location and/or availability of electric vehicle charging stations could be maintained using a similar system to that described above.

Similarly, whilst embodiments described in the foregoing detailed description refer to GPS, it should be noted that the mobile devices 200, e.g. navigation apparatus, may utilise any kind of position sensing technology as an alternative to, or indeed in addition to, GPS. For example, the navigation apparatus may utilise other global navigation satellite systems, such as the European Galileo system. Equally, it is not limited to satellite-based systems, but could readily function using ground-based beacons or other kind of system that enables the device to determine its geographic location.

It will also be well understood by persons of ordinary skill in the art that whilst the preferred embodiment may implement certain functionality by means of software, that functionality could equally be implemented solely in hardware (for example by means of one or more SICs (application specific integrated circuit)) or indeed by a mix of hardware and software.

Lastly, it should be noted that whilst the accompanying claims set out particular combinations of features described herein, the scope of the present invention is not limited to the particular combinations of hereafter claims, but instead extends to encompass any combination of features or embodiments herein disclosed irrespective of whether or not that particular combination has been specifically enumerated in the accompanying claims at this time.

The invention claimed is:

1. A method of estimating the location of an object within a geographical area based upon potential object location data reported by a plurality of mobile devices having location determining means, the method comprising:
   collecting potential object location data from the plurality of mobile devices,
   dividing the geographical area into a plurality of regions, and for at least some of the regions: determining information indicative of the distance between a point associated with a region and the potential object location reported by at least some of the mobile devices, and applying an estimator model to assign a score to the point indicative of a probability that the point corresponds to an actual object, the applying comprising generating histograms based on distances between the point and each potential object location and applying the estimator model to the histograms to generate the score for the point, and
   estimating the location of the object based upon the scores assigned to the points.

2. The method according to claim 1, comprising selecting the points to which the estimator model is applied based upon the number of potential object reports within a predetermined distance of the point.

3. The method according to claim 1, including determining which points have an assigned score greater than a predetermined threshold, clustering qualifying points that lie within a predetermined distance of each other and performing a weighted average to estimate the location of the object.

4. The method according to claim 1, wherein the method is repeated with new reported potential object location data periodically or substantially continuously.

5. The method according to claim 1, comprising estimating the location of a speed enforcement device.

6. A method of creating an estimator model for estimating the geographical location of an object based upon location information supplied by a plurality of mobile devices with location determining means, the method comprising:
   collecting known actual object location data of a number of objects,
   collecting reported potential object location data from the plurality of mobile devices,
   defining at least one parameter indicative of the relationship between the known actual object location data and the reported potential location data,
   calculating the value of the or each parameter for each pair of known actual object locations and reported potential object locations,
   generating at least one histogram representing the calculated value of the or each parameter for each known actual object location, and
   using the or each histogram to create a scoring function capable of representing the probability that a histogram is indicative of an actual object, the scoring function comprising a kernel machine that is trained using the or each histogram.

7. The method according to claim 6, further comprising applying location data of known false locations, calculating the value of the or each parameter for each pair of known false locations and reported potential object locations, and generating at least one histogram representing the calculated value of the or each parameter for each known false object location.

8. The method according to claim 7, wherein the false object location data comprises one or more randomly generated locations within an area having at least a minimum number of reported potential object locations, and which are a predetermined minimum distance from known actual object locations.

9. The method according to claim 6, wherein the step of generating at least one histogram may comprise creating multiple histograms for at least some of the known locations at different spatial resolutions.

10. The method according to claim 6, wherein multiple histograms are generated for at least some of the known locations using two or more of the parameters.

11. The method according to claim 6, wherein the parameters comprise one or more of the following: the geographic distance between locations, the travel time between locations and the distance between locations on the road network.

12. The method according to claim 1, further comprising creating the estimator model according to claim 6.

13. A non-transitory computer readable medium comprising computer readable instructions, which, when executed on a computer, cause the computer to perform a method according to claim 1.

14. A system arranged to process data for the maintenance of a database containing the geographic location of objects, the system comprising:

a communication device for receiving reports from a plurality of mobile devices having location determining means, the reports each comprising geographical location data of a potential object;

one or more processors; and a memory comprising instructions which, when executed by the one or more processors, cause the system to:

collect potential object location data from the plurality of mobile devices, divide the geographical area into a plurality of regions, and for at least some of the regions: determining information indicative of the distance between a point associated with a region and the potential object location reported by at least some of the mobile devices, and applying an estimator model to assign a score to the point indicative of a probability that the point corresponds to an actual object, the applying comprising generating histograms based on distances between the point and each potential object location and applying the estimator model to the histograms to generate the score for the point, and estimate the location of the object based upon the scores assigned to the points.

* * * * *